United States Patent

Johnson

[15] 3,679,928

[45] July 25, 1972

[54] HIGH INTENSITY FAR U.V. RADIATION SOURCE

[72] Inventor: Peter D. Johnson, Schenectady, N.Y.

[73] Assignee: General Electric Company

[22] Filed: June 26, 1970

[21] Appl. No.: 50,106

[52] U.S. Cl..............................313/225, 313/185, 313/112
[51] Int. Cl..........................................................H01j 61/12
[58] Field of Search..................313/112, 223, 224, 225, 226, 313/227, 228, 229, 185

[56] References Cited

UNITED STATES PATENTS

R21,150   7/1939   Von Lepel..........................313/227 X
2,034,572  3/1936   Found................................313/223 X
2,757,305  7/1956   Dziergwa.............................313/112

Primary Examiner—Alfred L. Brody
Attorney—Paul A. Frank, John F. Ahern, Jerome C. Squillaro, Frank L. Neuhauser, Oscar B. Waddell and Joseph B. Forman

[57] ABSTRACT

A far U.V. radiation source emitting high intensity of U.V. wavelengths principally shorter than 2,300 A.U. includes a low pressure of mercury vapor in the range $10^{-3}$ to 0.75 torr under operating conditions in an ambient of a noble gas at a pressure of 0.5 to 25 torr. During operation, lamp current is very high, in range of 0.5 to 25 ampere/cm.$^2$, emitting strongly at 1,849 and 1,942 A.U.

12 Claims, 3 Drawing Figures

PATENTED JUL 25 1972    3,679,928
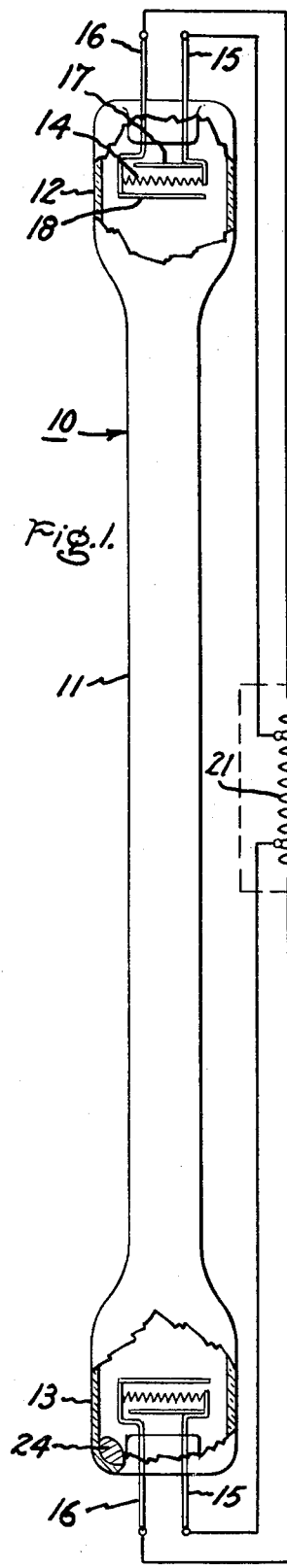
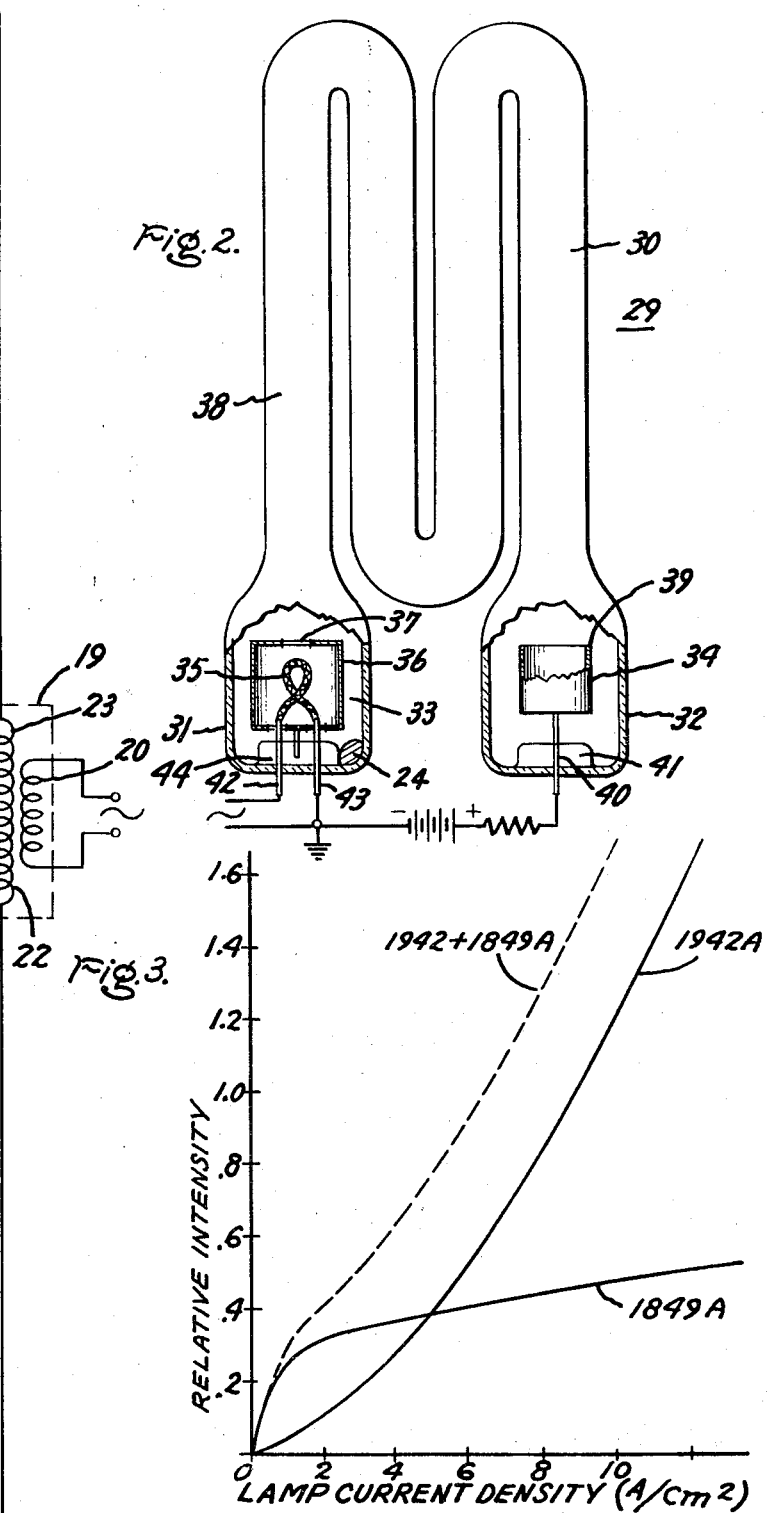
Inventor:
Peter D. Johnson,
by John F. Ahern
His Attorney.

HIGH INTENSITY FAR U.V. RADIATION SOURCE

The present invention relates to far ultraviolet light sources. More particularly, the invention relates to such sources which emit radiation of wavelengths having enhanced photochemical stimulation properties otherwise previously unobtainable at useful intensities and efficiencies.

This application is related to my concurrently filed co-pending applications, Ser. No. 50,203 and Ser. No. 50,105.

Electric lamps emitting ultraviolet radiation generally utilize a gaseous discharge utilizing mercury as the working gas. In most prior art devices utilized for this purpose, the lamp parameters, of low current (below 0.2 amperes per square centimeter) and low pressure of emitting specie (below 1 torr), are such that the principal radiation supplied is above 2,300 A.U., primarily that of the 2,537 A.U. line which is so strong, under the parameters of the prior arts as to usually dominate such ultraviolet emission. I have found that, although the 2,537 A.U. ultraviolet wavelength emission is useful for many purposes, it is very inefficient in causing many photochemical reactions, as for example, crosslinking of polymers and breaking of polymeric bonds. Other U.V. emitting lamps, which emit shorter wavelength radiation, are operated at high pressure (several atmospheres) and high current, (above 1 ampere per square centimeter), but still only emit useful U.V. radiation at wavelengths longer than 2,300 A.U., which radiation is not effective for many photochemical reactions, particularly the crosslinking of many polymers.

Accordingly, it is an object of the present invention to provide far ultraviolet light sources having heretofore unavailable useful far ultraviolet wavelength emission useful for photochemical stimulus.

Still another object of the present invention is to provide far ultraviolet light sources utilizing a gaseous vapor discharge to produce extremely short wavelength ultraviolet radiation.

Still another object of the present invention is to produce far ultraviolet radiation sources having relatively high efficiency of radiation and high intensity spectral output of the 1,849 A.U. and 1,942 A.U. mercury emission lines.

Still another object of the present invention is to provide improved vapor-electric emitting, far ultraviolet light sources useful for photochemical reactions.

Briefly stated, in accord with one embodiment of the present invention, I provide an evacuable bulb or envelope having an ultraviolet transmissive portion wherein the vapor of a light emitting metallic specie, such as mercury vapor, is maintained under operating conditions of an extremely low pressure and is caused to sustain extremely high currents therethrough causing relatively high efficiency excitation of the 1,849 A.U. and 1,942 A.U. mercury emission lines to high intensity of emission which emission is highly useful in stimulating photochemical reactions.

The novel features believed characteristic of the present invention are set forth in the appended claims. The invention itself, together with further objects and advantages thereof, may best be understood with reference to the following detailed description, taken in connection with the appended drawing in which FIG. 1 is a vertical view, with parts broken away, of a lamp constructed in accord with the present invention and suitable for operation for the production of high intensity photochemically useful far ultraviolet light, FIG. 2 is an alternative embodiment to the device of FIG. 1 and FIG. 3 is a graph containing typical curves for respective wavelength emissions, illustrating intensity as a function of lamp current density of a typical lamp constructed in accord with the present invention.

FIG. 1 illustrates a simplified far ultraviolet lamp in accord with the present invention. The lamp of FIG. 1 includes an evacuable envelope, represented generally at 10, which includes an ultraviolet transmissive central member 11 and a pair of enlarged electrode-containing end members 12 and 13, respectively. Each of end members 12 and 13 includes a cathode assembly 14 with in this instance is externally heated and is mounted between the inboard ends of a pair of inleads 15 and 16, respectively. Each of inleads 15 and 16 has connected, immediately adjacent the filament and substantially parallel thereto, a pair of auxiliary anode members 17 and 18, respectively. These members, on alternate cycles of an alternating current voltage exciting the device under alternating current operation, serve as anode members to sustain an electric discharge. The desired current and voltage to operate the lamp is supplied by a power supply means, capable of supplying the requirements of the lamp in operation and may take a number of forms, but which is, for example, illustrated generally as a saturable transformer represented by dotted line box 19. Transformer 19 includes a primary winding 20 and a voltage step-up secondary winding 21 having a pair of tapped secondary low voltage portions 22 and 23 which are connected across respective pairs of electrode inleads 15 and 16 on either end of the lamp so as to provide alternating current heating of each of the filaments 14 by the voltage developed across the tapped secondary. This voltage is necessarily low, of the order of several volts, to cause external heating of the filament to sustain the thermionic emission of electrons to sustain an electric discharge between the filament and anode members at respective ends of the arc tube. The filaments are essentially similar to conventional fluorescent lamp filaments, although the design is not critical. The lamp is charged with a low pressure of a noble buffer gas and a sufficient quantity 24 of a vaporizable ionizable metal.

In operation, the lamp is started by the application of a line voltage, which may be of any desired voltage but which may conveniently be 120 or 240 volts, to the primary of the excitation transformer 19 and, due to the external excitation of the filaments 14, the lamp is immediately operative. A quantity of a vaporizable, ionizable metal, in this instance, mercury, is present as charge 24 within the lamp, as is a filling of a relatively low pressure, as for example, 0.5–25 and preferably approximately 2–5 torr of an inert noble gas such as, helium, argon or neon. Operationally, the application of the initial voltage causes an electric discharge sustained by the noble gas, which is immediately ionized thereby, which excited gas discharge maintains the bulb wall at a temperature consistent with the desired vapor pressure of mercury within the lamp envelope to cause the establishment of a sufficient pressure of mercury to permit ionization thereof and transfer of the discharge to mercury, as the conducting specie.

FIG. 2 illustrates another embodiment of the invention, functionally equivalent to the device of FIG. 1, but having certain structural modifications, illustrating the versatility with which structure embodying the invention may be constructed.

In FIG. 2, an evacuable envelope represented generally as 29, includes an ultraviolet transmissive central portion 30, having three 180° C. serpentine curves and four substantially straight sections, shown for convenience only. It should be appreciated that the number of straight sections and the number of serpentine curves may be increased to any desired number and the total length of the discharge path may be made any desired length, generally being tailored to fit the size of the total light emitting area in order to suit the purpose to which the lamp is put, generally in the reactive photochemical processing of monomers and polymers, often in the form of thin films on substrate surfaces.

End portions 31 and 32 of the device of FIG. 2, adapted to be operated with direct current excitation, respectively include a cathode assembly 33 and an anode assembly 34. Cathode assembly 33 may conveniently have the so-called M1 cathode structure, that is, a dispenser type filament member 35 containing a single loop and fabricated from a mesh stocking container containing a particulate mass of a thermionic emitting substance, such as barium aluminate or lanthanum boride, for example. A cathode shield member 36 laterally surrounds the filament member 35 and contains an aperture 37 therein for the escape of electrons to sustain an electric discharge along the axis of the first substantially straight portion 38 of central region 30 of envelope 29. Anode assembly 34, in its simplest structure, contains a collector means which, in this instance, is shown as a hollow cup 39 mounted upon an inlead 40 which passes through pinch 41 in the envelope end, just as filament 35 is mounted upon, and electrically connected between, inleads 42 and 43, which pass through pinch 44 in envelope end 31. It is desirable that cathodes and anodes of these general types, respectively, be used under direct current excitation in order to maintain the high rate of current conduction in the steady state as may be required, although it is to be appreciated that for direct current excitation, any suitable cathode and anode structure which are able to maintain gas current densities of up to 100 amperes per square centimeter but preferably up to 25 amperes per square centimeter are suitable.

Similarly, although a particular type of electrode structure is shown in the device of FIG. 1 for the maintenance of the high current density characteristic of lamps in accord with the A.C. excited embodiment of the present invention, it should be appreciated that any similar electrode structure which is capable of maintaining the aforementioned current densities under alternating current excitation is suitable. Alternatively, for alternating current operation, a lamp may be fabricated without electrodes and excitation thereof may be accomplished in accord with the technique described in application Ser. No. 653,749, filed July 17, 1967, in the name of J. M. Anderson, and assigned to the present assignee, now U.S. Pat. No. 3,500,118. In such an arrangement, a closed loop constitutes the discharge path within an hermetically sealed envelope containing an appropriate ionizable fill. A radio frequency oscillator is connected to a primary winding which is coupled to the closed loop through a high radio-frequency permeable ferrite core. The secondary of the excitation transformer is the discharge path through the closed loop of the lamp which passes through a portion of the core and is excited thereby. Such systems operate ideally at frequencies of 500 kilocycles and above and are suitable for the production of high current density at low pressure, in accord with the present invention, wholly independent of electrode phenomena.

In the embodiment of FIGS. 1 and 2, a fill of a noble gas such as helium, neon or argon of a pressure of approximately 0.5–25 torr and preferably approximately 2–5 torr is contained within the envelopes. Similarly, a suitable quantity 24 of volatizable, ionizable, conducting specie, such as mercury, is included within the envelope and is adaptable, upon heating by an initial discharge established within the noble gas, to be vaporized and ionized such as to cause the discharge essentially to become a mercury vapor discharge at low pressure and high current density for efficient emission of the characteristic 1,849 and 1,942 A.U. mercury lines.

I have discovered that, whereas the prior art workers have been unable to produce any photochemically useful intensity of either the 1,849 A.U. or the 1,942 A.U. resonance line of mercury under previous, normal conditions of operation of vapor discharge lamps, namely that of relatively high pressures, I am able, by controlling the mercury pressure within the lamp to be within the range of $8\times10^{-4}$ to approximately 0.75 torr and preferably in the range of $2\times10^{-3}$ to 0.3 torr, while simultaneously maintaining the currents through the lamp at a current density in the range of approximately 0.5 to 25 amperes per square centimeters, but preferably within a range of approximately 0.5–10 amperes per square centimeter, to obtain, particularly at current densities in excess of approximately 4 amperes per square centimeter, a high degree of intensity of the 1,849 A.U. line and the 1,942 A.U. resonance line of mercury. This intensity exceeds the intensity of emission of the conventional 2,537 A.U. radiation, which is the only usefully efficient far ultraviolet mercury radiation by lamps of the prior art.

The low pressure of mercury within the lamps in accord with the present invention is maintained primarily by maintaining control of the coldest portion of the lamp wall, generally in the region of the cathode and anode electrodes. As hereinafter utilized, the term "bulb wall temperature" will be utilized to identify the minimum temperature at which any portion of the interior of the bulb wall exists during steady state operation. This temperature is utilized, as a frame of reference, because it effectively controls the pressure of the mercury vapor within the lamp by virtue of the fact that the pressure of mercury vapor within the lamp is controlled by the degree of condensation of the vapor at the coldest portion of the bulb wall. In accord with the present invention, I maintain a bulb wall temperature within the range of approximately 15° to 120° C. and a preferred range of from approximately 25° to 100° C. More particularly, in order that the optimum emission of the 1,849 A.U. mercury line by obtained, the lamp should operate at a temperature of approximately 35° to 100° C., yielding a mercury pressure within the lamp envelope of approximately $4\times10^{-3}$ to 0.3 torr. On the other hand, for the optimum emission of 1,942 A.U. resonance mercury radiation, the temperature of the envelope wall should be within the range of approximately 25° to 50° C., yielding pressure within the envelope within the range of approximately $2\times10^{-3}$ torr to $1.3\times10^{-2}$ torr.

The current density within the lamp is maintained at the desired range by appropriately adjusting the total current through the discharge and the diameter of the narrow, U.V. transmissive portion of the lamp envelope. The total current is controlled by external impedances and is adjusted to obtain maximum output from the radiating spectroscopic states of the radiant species.

In general, for alternating current operation lamps in accord with the present invention may readily operate at a voltage from 20 to 100 volts A.C. at a current density of 10 amperes, per cm$^n$, although operation at current densities up to 25 amperes per square centimeter is quite useful and lamps have been operated at current densities of as high as 100 amperes per square centimeter. A typical lamp configuration for the attainment of such operation, namely, at a current density of approximately 10 amperes per square centimeter and a pressure of approximately 3 torr, may readily be obtained within a lamp envelope having an interior diameter within the ultraviolet transmissive region of approximately 1 centimeter and a length of approximately 50 centimeters with an applied voltage of 50 volts.

FIG. 3 of the drawing illustrates a typical plot of lamp intensity, in arbitrary units, plotted as a function of lamp current, in amperes per square centimeter. As may be seen, the intensity for the 1,849 A.U. line rapidly reaches a maximum value and asymptotically approaches that maximum and saturates, maintaining that maximum for any further increase in current density. On the other hand, the 1,942 A.U. resonance radiation increases exponentially as a 1.7 power function of the current density. The principal limiting factor upon the ultraviolet intensity obtained from this line emission is the saturation of the emission of the excited mercury. As a practical matter, for most modes of operation, a useful maximum of approximately 25 amperes per square centimeter is obtainable. It is to be noted, however, that utilizing high density alumina or high density yttria or other similar ultraviolet transmissive ceramic envelopes permits the desired temperature of operation. In such environments, lamps have been successfully operated in accord with the present invention at current densities as high as 100 ampere per square centimeter. Accordingly, it is within the scope of the present invention that other materials than soft quartz extending into the high density translucent and ultraviolet transmissive ceramics may be utilized in accord with the present invention. Lamps operated in accord with the present invention have very high intensities of emission of the 1,849 A.U. and 1,942 A.U. lines. These wavelengths, heretofore emitted only trivially by lamps of the prior art, are emitted with high efficiencies. For example, the 1,942 A.U. line exhibits energy efficiencies as high as 30 percent when emitted by lamps constructed and operated in accord with the present invention.

I have found that the scientific characterization of the lamp in accord with the invention has been that of a high electron temperature within the positive column of the discharge and that the discharge is distributed over the entire positive column and is not a mere cathode phenomenon. This is particularly evidenced by the fact that the lamps in accord with the present invention may be operated in electrodeless environments. With this high electron temperature, I find that a high percentage of the excited mercury specie exists in the atomic $^1P_1$ spectroscopic state and the ionic $^2P_{1/2}$ spectroscopic state.

In accord with another feature of the present invention, I provide a sufficient quantity of mercury to the lamp envelope so that there is always an excess of mercury within the lamp and the vicinity of the coldest portion of the bulb wall. This provides for "cleaning up" of the mercury specie by deposition of metallic mercury upon lamp parts or on the lamp envelope wall without decreasing the pressure below the desired predetermined pressure at which the lamp is to operate. As is mentioned hereinbefore, the lamps of the present invention are governed according to the interior diameter of the bulb wall in order that the current density for any given current may be controlled, although this control is not the exclusive factor. In order to maintain the current (and hence the predetermined current density) within the appropriate range, the voltage source is chosen to have an internal limiting impedance (or an external impedance is supplied) so that the current is limited, as for example, by saturation of a saturable transformer. The operating voltage is that required by the discharge path size and shape. Thus, for example, a given discharge of mercury at 0.01 torr may require a voltage of 1 volt per cm in argon at 3 torr ambient. A 50 cm long discharge tube of a diameter, about 1 cm, requires a voltage of approximately 50 volts. Further choices of operating voltages are well within the perview of one skilled in the art. Generally, however, the lamps of the invention operate on a voltage which is generally of the order of 20 to 100 volts, with an appropriate impedance, and the interior bulb wall diameter varies over a range of approximately 3 to 40 millimeters, but is preferably maintained within the range of 5 to 25 millimeters, for maximum intensity and efficiency of U.V. light output. The length of the ultraviolet transmissive portion of the lamp may be any value above about 10 centimeters with no substantial upward limit, the upward limit being substantially governed by the configuration to which the lamp must conform for operational purposes.

Lamps constructed in accord with the present invention are of great utility in stimulating photochemical reactions. More particularly, the photopolymerization of thin monomeric films in the production of photoresist-like substance is one very useful purpose to which lamps in accord with this invention may be placed. In particular, a very substantial use has been found in the photopolymerization of hexachlorobutadiene. Photopolymerization of hexachlorobutadiene with ultraviolet radiation is described, from the chemical viewpoint, in greater detail in the application of A. N. Wright, Ser. No. 648,132, filed Feb. 23, 1967, now U.S. Pat. 3,522,076. Other uses for lamps of the present invention are in the radiation of other photoresists and the stimulation of various chemical reactions such as photosynthesis. Previously commercially available ultraviolet light sources have been utilized for this purpose, but all such low pressure, low current lamps emit predominantly the 2,537 A.U. mercury line. Similarly, high pressure, high current mercury vapor lamps have been used to emit shorter wavelength U.V. radiation, but still at wavelengths of 2,300 A.U. or longer. Such wavelengths are not as effective for many chemical reactions which are selectively responsive to effective radiation wavelengths of the order of 2,300 A.U. or lower and particularly lower than 2,000 A.U.

By the foregoing, I have described new and improved far ultraviolet emitting vapor discharge lamps selectively emitting ultraviolet radiation of the 1,849 A.U. and 1,942 A.U. mercury lines which have high efficiencies of up to 30 percent and high luminous intensity in the far ultraviolet and which are selectively useful for stimulating photochemical reactions.

While the invention has been described herein with respect to certain specific examples on preferred embodiments thereof, many modifications and changes will readily occur to those skilled in the art. Accordingly, I intend by the appended claims to cover all such modifications and changes as fall within the sphere and scope of the foregoing disclosure.

What I claim as new and desire to secure by Letters Patent of the United States is:

1. A far ultraviolet emitting lamp comprising:
   a. an evacuable envelope including as a portion thereof a U.V. transmissive section having a predetermined cross-sectional area;
   b. a filling within said lamp of
   $b_1$. a partial pressure of a noble ionizable gas selected from the group consisting of helium, argon, neon within the pressure range of approximately 0.1 to 25 torr,
   $b_2$. a quantity of a vaporizable ionizable metal sufficient under lamp operating conditions to provide a steady state partial pressure of metal vapor within said envelope within the range of $10^{-3}$ to 0.75 torr, at operating lamp envelope temperature;
   c. means coupled with said filling within said envelope for applying an electric voltage thereto,
   $c_1$. said voltage being sufficient to establish an electric discharge within said lamp to establish a U.V. emitting electric plasma within said U.V. transmissive section of said envelope,
   d. said lamp plasma including principally ionized mercury sustaining a current density of at least 0.5 ampere/cm$^2$ and emitting at least one strong band of resonance radiation within the range of 1,800 to 2,200 A.U.

2. The lamp of claim 1 wherein said vaporizable ionizable metal is mercury and said resonance radiation includes radiation at wavelengths of substantially 1,849 A.U. and 1,942 A.U.

3. The lamp of claim 1 wherein said current density sustained by said plasma charge lamp operation is at least 10 A/cm$^2$.

4. The lamp of claim 1 wherein the partial pressure of said gas within said envelope is from approximately 2 to 4 torr.

5. The lamp of claim 1 wherein said plasma sustains a current of from approximately 4.0 to 100 A/cm$^2$.

6. The lamp of claim 5 wherein the plasma sustains a current of from approximately 5 to 25 A/cm$^2$.

7. The lamp of claim 1 wherein said means for applying a voltage to the filling within said lamp include a pair of electrodes sealed through end regions of said lamp and located within said evacuable envelope.

8. The lamp of claim 7 wherein one of said lamp electrodes is a thermionically emissive cathode.

9. The lamp of claim 7 wherein both of said electrodes are thermionically emissive and means adapted to serve as anode electrode members are associated with each of said electrodes.

10. The lamp of claim 1 wherein said means for applying a voltage to said filling within said lamp is externally located with respect to said envelope and is inductively coupled thereto.

11. The lamp of claim 1 wherein said lamp envelope is maintained at a minimum interior temperature of approximately 35°–100° C., yielding a mercury vapor pressure of approximately $4 \times 10^{-3}$ to 0.3 torr and said lamp emits strongly at 1,849 A.U. wavelength.

12. The lamp of claim 1 wherein said minimum interior lamp envelope is maintained at a temperature of approximately 25° to 50° C., yielding a mercury vapor pressure of approximately $2 \times 10^{-3}$ to $1.3 \times 10^{-2}$ torr and said lamp emits strongly at 1,942 A.U. wavelength.

* * * * *